No. 835,279. PATENTED NOV. 6, 1906.
B. HASKELL.
TELEGRAPH POLE.
APPLICATION FILED MAY 7, 1906.
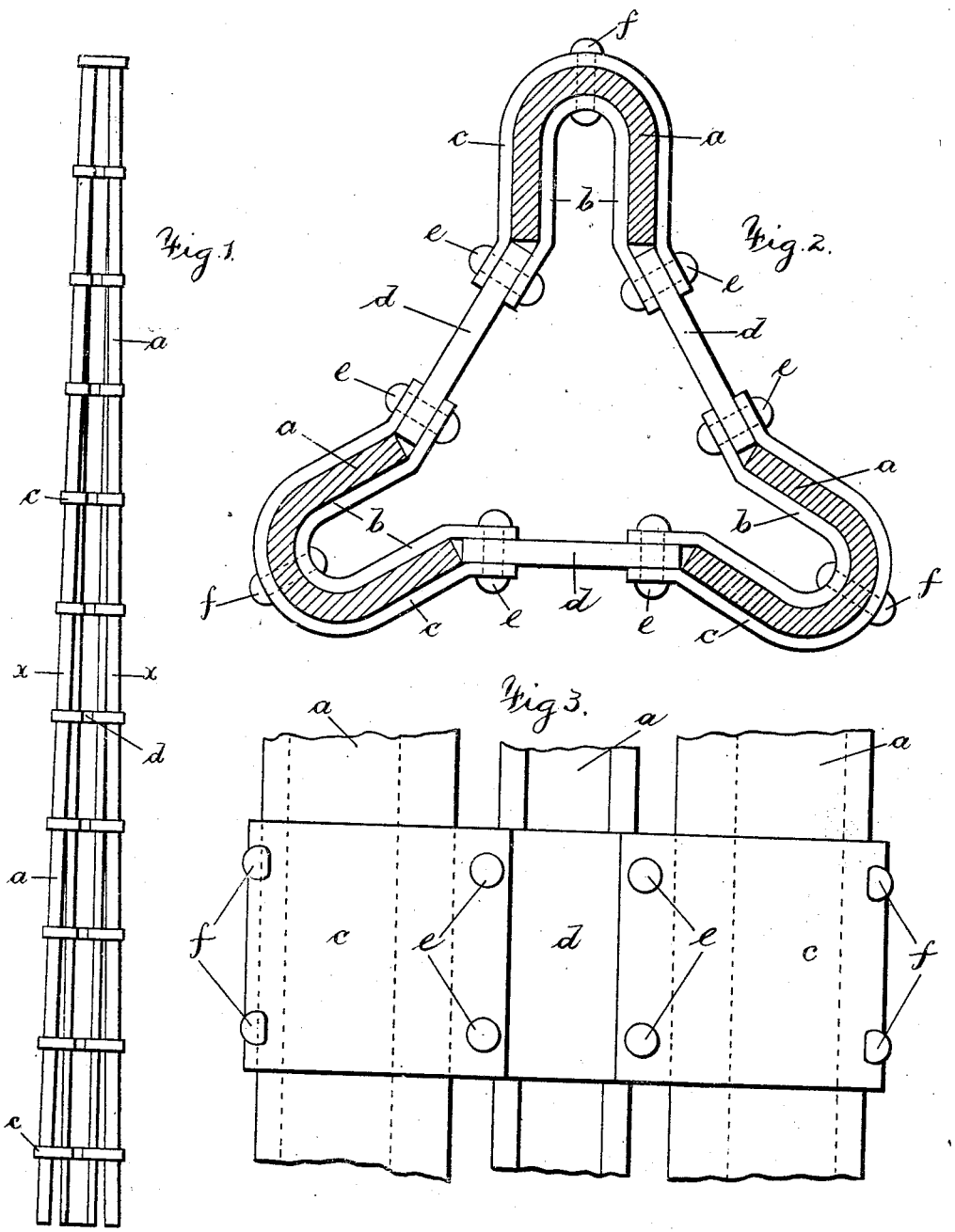

UNITED STATES PATENT OFFICE.

BRODERICK HASKELL, OF FRANKLIN, PENNSYLVANIA.

TELEGRAPH-POLE.

No. 835,279.  Specification of Letters Patent.  Patented Nov. 6, 1906.

Application filed May 7, 1906. Serial No. 315,566.

*To all whom it may concern:*

Be it known that I, BRODERICK HASKELL, a citizen of the United States, residing at Franklin, in the county of Venango and State of Pennsylvania, have invented an Improvement in Poles for Telegraphs, &c., of which the following is a specification.

My invention relates to poles for telegraphs, &c., and in carrying out the same I employ a plurality of uprights, clips conforming to the inner and outer surfaces of the uprights, the said clips being employed in pairs. I also employ connecting-bars extending between the ends of adjacent pairs of clips and means for connecting the ends of the connecting-bars to the ends of the clips, as will be hereinafter described.

In the drawings, Figure 1 represents an elevation of my improved pole for telegraphs, &c. Fig. 2 is an enlarged cross-section on line $x\,x$, Fig. 1; and Fig. 3 is an enlarged partial elevation.

$a$ represents the metallic uprights, which are preferably U-shaped in cross-section.

$b$ represents inner clips which are shaped to conform with the inner surfaces of the uprights, and $c$ represents outer clips which are shaped to conform to the outer surfaces of the uprights. The clips $b$ and clips $c$ are employed in pairs, an outer and an inner clip forming one pair, and the end portions of the said clips are offset outwardly, so as to be parallel with one another.

$d$ represents connecting-bars which extend between the ends of adjacent pairs of clips, the ends of the connecting-bars $d$ being passed between the offset ends of the clips, and these parts are secured together by means of rivets $e$, or otherwise, as may be found expedient not only to connect the uprights together, but to secure the same between each pair of clips. The connecting-bars $d$ are preferably so placed that the ends thereof abut against the edges of the uprights $a$, acting to space the same apart. I also prefer to employ rivets $f$, or bolts, or other equivalent means, which are passed through the outer clips $c$, uprights $a$, and the inner clips $b$ at the central point of the curved portions thereof.

As will be readily apparent, the desired taper to the pole is attained by varying the lengths of the connecting-bars $d$, and it is to be understood that this form of assembling uprights is equally applicable to derricks, towers, and other structures in which it might be employed.

It is also to be noted that, as illustrated, the connecting-bars $d$ are somewhat thinner than the metal of the uprights $a$, which provision manifestly makes it possible in assembling the parts to spring the outturned ends of the inner and outer clip members to bind the edges of the upright members between them.

I claim as my invention—

1. A pole for telegraphs, &c., comprising a plurality of uprights, clips conforming with the inner surfaces of said uprights, other clips conforming with the outer surfaces of said uprights and placed in corresponding positions with the aforesaid clips, connecting-bars extending between the said clips, and means for connecting the ends of said clips to the ends of said connecting-bars.

2. A pole for telegraphs, &c., comprising a plurality of uprights of U shape in cross-section, clips conforming with the inner surfaces of said uprights, other clips conforming with the outer surfaces of said uprights and placed in positions corresponding to those of the aforesaid clips, connecting-bars extending between the ends of said clips, and means for connecting the ends of said clips to the ends of said connecting-bars.

3. A pole for telegraphs, &c., comprising a plurality of uprights of U shape in cross-section, clips conforming with the inner surfaces of said uprights and having their end portions offset outwardly, other clips conforming with the outer surfaces of said uprights and having their end portions offset to a position making them parallel with the said offset end portions of the aforesaid clips, connecting-bars extending between the offset end portions of the said clips, and means for connecting the offset ends of said clips to the ends of said connecting-bars.

4. A pole for telegraphs, &c., comprising a plurality of uprights of U shape in cross-section, clips conforming with the inner surfaces of said uprights and having their end portions offset outwardly, other clips conforming with the outer surfaces of said uprights and having their end portions offset to a position making them parallel with the said offset end portions of the aforesaid clips, connecting-bars extending between the said clips with the ends thereof passed between the offset end portions of said clips, rivets passing through the offset end portions of said clips and the ends of the connecting-bars to secure the parts together.

5. A pole for telegraphs, &c., comprising a plurality of uprights of U shape in cross-section, clips conforming with the inner surfaces of said uprights and having their end portions offset outwardly, other clips conforming with the outer surfaces of said uprights and having their end portions offset to a position making them parallel with the said offset end portions of the aforesaid clips, connecting-bars extending between the said clips with the ends thereof passed between the offset end portions of said clips, rivets passing through the offset end portions of said clips and the ends of the connecting-bars to secure the parts together, and rivets passing through the said clips, and uprights at the central point of the curved portions thereof.

Signed by me this 26th day of April, 1906.

BRODERICK HASKELL.

Witnesses:
GEO. T. PINCKNEY,
E. ZACHARIASEN.